United States Patent [19]

Chen et al.

[11] Patent Number: 4,866,629

[45] Date of Patent: Sep. 12, 1989

[54] MACHINE VISION PROCESS AND APPARATUS FOR READING A PLURALITY OF SEPARATED FIGURES

[75] Inventors: Inn-Ming Chen; Yeu-Hwa Shyy; Ching-Fu Chung; Dar-Jong Hwang; Jenq-Chang Yeh; Hsu-Lung Wu, all of Hsin Chu Hsien, Taiwan

[73] Assignee: Industrial Technology Research Institute, Hsin Chu Hsien, Taiwan

[21] Appl. No.: 118,036

[22] Filed: Nov. 9, 1987

[51] Int. Cl.⁴ .............................. G06K 9/00
[52] U.S. Cl. ................... 364/468; 364/489; 364/560; 358/101; 382/8
[58] Field of Search ............ 364/468, 488–491, 364/560, 564; 358/101; 382/8

[56] References Cited

U.S. PATENT DOCUMENTS

| | | | |
|---|---|---|---|
| 4,596,037 | 6/1986 | Bouchard et al. | 358/101 |
| 4,680,627 | 7/1987 | Sase et al. | 358/101 |
| 4,720,870 | 1/1988 | Billiotte et al. | 358/101 |
| 4,754,329 | 6/1988 | Lindsay et al. | 358/101 |
| 4,757,550 | 7/1988 | Uga | 358/101 |

Primary Examiner—Allen MacDonald
Attorney, Agent, or Firm—Cushman, Darby & Cushman

[57] ABSTRACT

A machine vision process and apparatus for reading a plurality of separated figures, such as the hole-position diagram of a printed-circuit board; the apparatus comprises an X-Y table to be moved on a plane and to be positioned at a given position, two photographing devies such as camaras being mounted over the X-Y table, and an image processing unit. The X-Y table is used for placing a diagram or the like so as to facilitate a first camera to photograph a large area and to facilitate a second camera to photograph a small and detailed separated figure. The image signal obtained will be transmitted to the image processing unit to find out the center coordinates of every separated figure, and the size and shape of every separated figure classified so as to find out the control data of size, position and the moving path in the real production process.

10 Claims, 4 Drawing Sheets

MACHINE VISION PROCESS AND APPARATUS FOR READING A PLURALITY OF SEPARATED FIGURES

BACKGROUND OF THE INVENTION

This invention relates to a machine vision process and apparatus, particularly, an apparatus which can photograph a plurality of separated figures on a plane diagram, and which can convert the figures into image signals to enter into an image processing unit for determining the center coordinates of the separated figures, and for analyzing the size, the shape, and the suitable connecting sequence of the separated figures.

In the conventional hole-position recognition procedures for a printed-circuit board, the speed, the precision and the reliability of the recognition operation are limited by manual operation; further, an expensive programming machine will increase a manufacturer's cost. Therefore, it is desirable to have a process and an apparatus which can recognize the hole position of a printed-circuit board at a high speed, with precision and reliability.

Generally, before drilling holes on a printed-circuit board provided by a customer, a manufacturer analyze the hole position and the size and shape of the holes on the hole-position diagram to find the best hole-drilling path, and will then set the operation procedures of the drilling machine. The conventional procedures for processing the hole-position diagram of a printed-circuit board are as follows:

1. The hole-position diagram is modified and photographed to make a transparent negative thereof.
2. The holes are classified with colors in accordance with their diameters (manual operation).
3. The holes of one class with one color are lined up (manual operation).
4. The coordinates of the holes are determined by using a programming machine (manual operation).
5. The coordinates of the holes are entered into a computer for obtaining the best permutation of hole-drilling path.
6. The data of the hole coordinates and the hole-drilling path are converted into a digital control program, and transmitted into a drilling machine.

In view of the aforesaid problems and demand, the inventor has developed a machine vision process and apparatus with an operation speed, precision and reliability desired.

SUMMARY OF THE INVENTION

A primary object of the present invention is to provide a horizontally movable X-Y table to carry a plane diagram having a plurality of separated figures in order to facilitate scanning the plane diagram by using a photographing device, such as a camera, whereby the image of the diagram is transmitted into an image processing unit to recognize the hole position, thereby replacing the manual processing procedures described above.

Another object of the present invention is to provide a first photographing device (e.g., a camera) for photographing a large area, and to provide a second photographing device (e.g., a camera) for photographing the detailed figures so as to facilitate a special image process and analysis procedure in order to obtain a high speed automatic diagram-reading method and apparatus.

A further object of the present invention is to provide a method of photographing the detailed figures, a method of auto-binary-thresholding, and a correction method for geometrical distortion so as to obtain an automatic diagram reading method and apparatus with a high precision.

DETAILED DESCRIPTION OF THE PREFERRED EMBODIMENT

Figure 1:
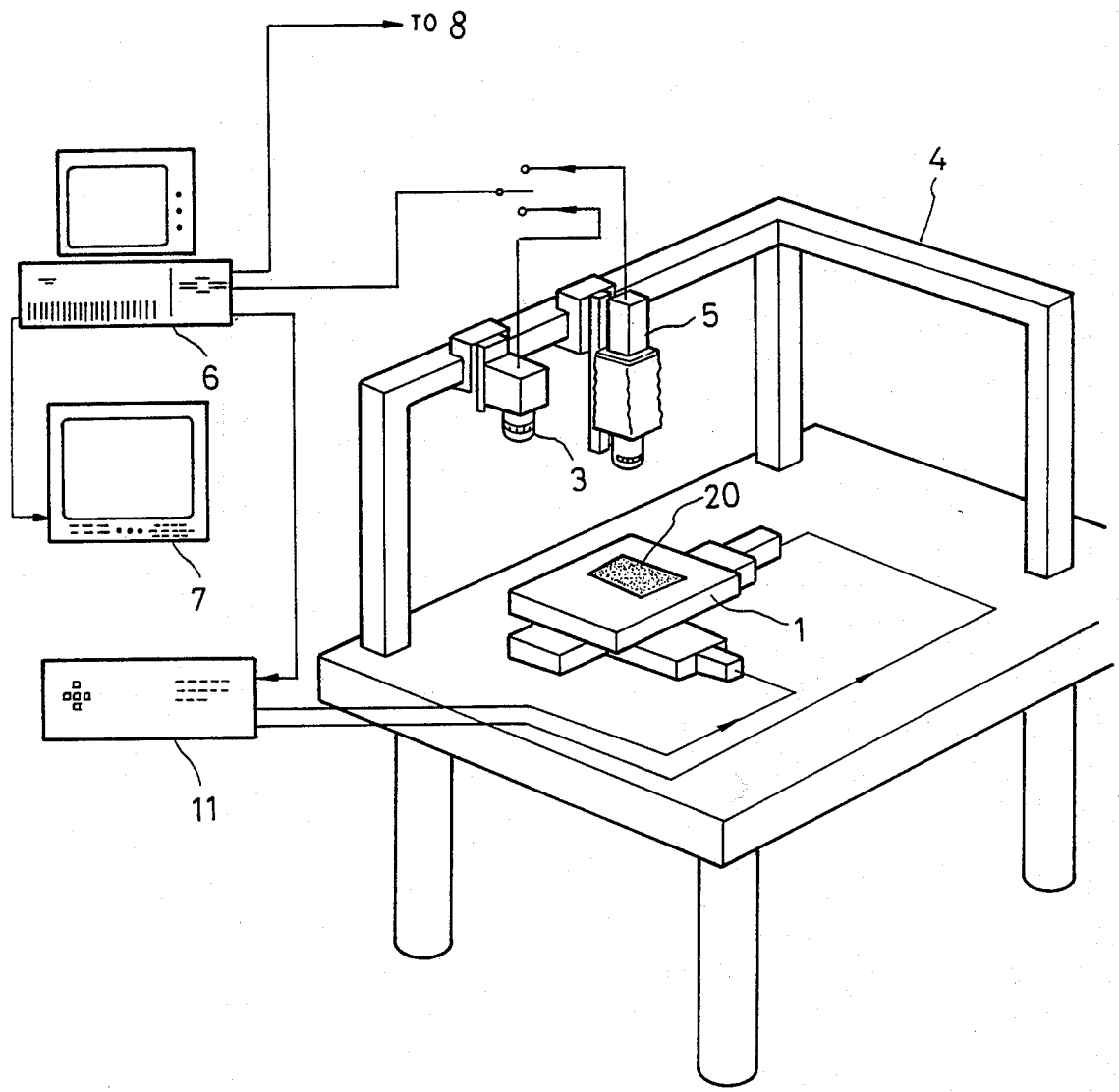
FIG. 1 illustrates the structure of the apparatus according to the present invention.

The present invention is described in detail with a preferred embodiment with reference to the accompanying drawings as follows:

FIG. 1 illustrates the structure of the present invention, which comprises: an X-Y table 1 to be controlled with a driving unit 11 to move and stop within a plane; the X-Y table 1 is used for supporting diagram 20, which may be a transparent diagram or a figure; under X-Y table 1, a light source is mounted for copying diagram 20. Camera 3 is fixedly mounted on a supporting frame 4 so as to photograph diagram 20 over a large area. Another camera 5 is also mounted on the supporting frame 4 for photographing the precision part of diagram 20;

An image processing unit 6 includes an image digitizing device, conventional picture analyzing software for processing the image and analyzing the diagram data, and Further, the image processing unit 6 also conventional control software to control the operations of the X-Y table 1, the cameras 3 and 5, and image processing unit 6 itself. The image processing unit 6 is also connected with display unit 7 to display the image. The image processing unit 6 can also be connected with a tape puncher or a processing device 8 (not shown) for data output.

The operation procedures of the present invention may be summarized as follows:

1. The large area of diagram 20 is converted into an image a signal by means of camera 3 so as to find the approximate center of each figure on an image through image processing unit 6.
2. The image coordinates determined by image processing unit 6 of the approximate center of each figure are converted into the coordinates of the X-Y table (diagram).
3. The total figures of the digram 20 are arranged into a reasonable sequence so as to obtain a precision photographing path.
4. The camera 5 for photographing smaller area is used for taking a small picture along the photographing path selected by means of the step 3 above so as to calculate, on the image, the precise center position of a figure. The size and shape of the figure are also obtained.

5. The image coordinates of the precise center position of all figures and their sizes are converted into the coordinate system of the X-Y table.

6. The figures are classified and arranged in a ideal sequence in accordance with the size and shape thereof so as to provide the image processing device 6 with a real operation data.

The aforesaid operation procedures are described in detail as follows:

1. The large area image processing: the camera 3 reads the image of a large area of diagram 20, i.e., the whole diagram being divided into several areas to be scanned in a sequence. The image is processed with an auto-binary-thresholding method (described below); the approximate center positions of all figures are determined and calculated by using the grid-point-skipping inspection method (described below).

1. Auto-binary-thresholding: since the images to be processed have a strong black-and-white contrast between the figures and background thereof, a corresponding binary threshold can quickly be estimated by using the calculation procedures described below in steps 1-4. An image captured by, for example, a TV camera, can be digitized by an A/D (analog/digital) converter and stored into a frame memory in a matrix form. Each element of the image matrix is called a pixel, and has a corresponding gray level stored in memory. The image having a multi-level gray scale (e.g., a plurality of gray level intensities representing the image) will then be converted into a bright black-and-white two level image in accordance with the threshold, i.e., the separated figures being black and the background portion being white, or vice versa.

1, For a digitized image, each of the various pixels has a corresponding gray level; the picture analyzing software will calculate the number of pixels $n_i$ with the corresponding gray level i, i=0, 1, 2, 3, ... m, where:

m=the maximum gray level, i.e., $\Sigma n_i = N$,
N=the total number of pixels.

2, The binary threshold is determined by first finding the average gray level. To find the average gray level t:

$$t = \sum_{i=0}^{m} (G_i \cdot n_i)/N,$$

in which $G_i$=Gray level.

3, To find the values of $N_1$, $N_2$, $t_1$ and $t_2$:

$$N_1 = \sum_{i=0}^{t} n_i$$

where $N_1$ is the total number of pixels whose gray levels are to be less than or equal to the binary threshold;

$$N_2 = \sum_{i=t}^{m} n_i$$

where $N_2$ is the total number of pixels whose gray levels are to be greater than or equal to the binary threshold;

$$t_1 = t \cdot N_1/N_2,$$

where $t_1$ is a left offset value;

$$t_2 = M - (m-t) \cdot N_2/N_1;$$

where $t_2$ is a right offset value;

4, To find the binary threshold T:

$$T = \frac{1}{2}(t_1 + t_2)$$

2. Grid-Point-Skipping Inspection Method (the method of locating a separated figure from a large area of image):

An ideal method of locating a separated figure should include the following major points:

1, Each figure should be processed only once.

2, A separated figure being processed should be removed from the image to avoid a duplicate process.

3, After a separated figure is processed, find the next separated figure quickly; do not omit any one separated figure.

4, Calculate the coordinates of a separated figure center quickly.

Figure 2:
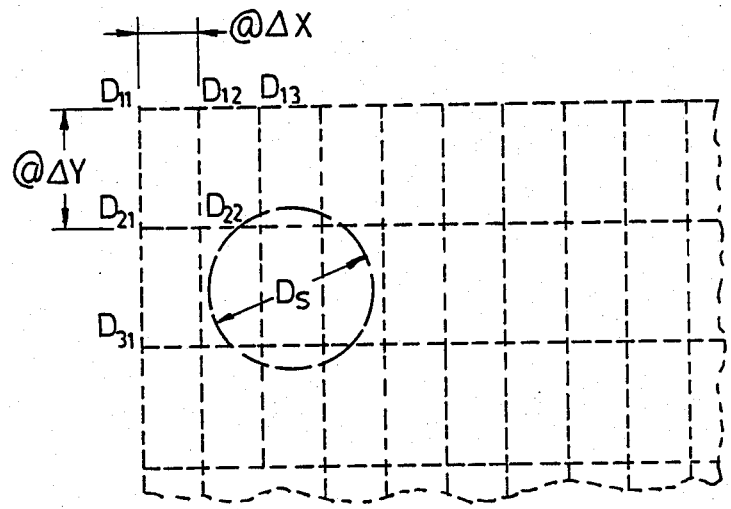
FIG. 2 illustrates the grid-point-skipping state upon inspecting a figure in a large area by using the image processing unit according to the present invention.

In order to satisfy the aforesaid four major points, a unique grid-point-skipping inspection method is developed in the present invention, and it is further described as follows:

1, Referring to FIG. 2, there is shown an image being divided into a plurality of grid points such as $D_{11}$, $D_{12}$ ..., $D_{21}$, $D_{22}$..., $D_{31}$..., etc. along the abscissa at a distance $\Delta X$ and the ordinate at a distance $\Delta Y$. $D_s$ indicates the diameter of a separated figure. The grid points are inspected in a regular sequence so as to find out, according to the brightness or darkness, whether a separated figure is present. Since the skipping inspection is limited to a given point (or points), the inspection speed can be greatly improved. The spaces of the grid points, $\Delta X$ and $\Delta Y$ are determined in accordance with width (such as the diameter of a figure Ds) of the smallest of a diagram so as to have the four grid points of a square lattice located within the minimum separated figure; consequently, a separated figure includes, at least, two grid points so as to prevent omitting any separated figure during grid-point inspection. For examples, to facilitate operation, let $\Delta Y = Ds - C$, and $\Delta X = \frac{1}{2} \Delta Y$, in which C=2 so as to adapt to the diameter $Ds \leq 18$ of the general separated figure.

Figure 3:
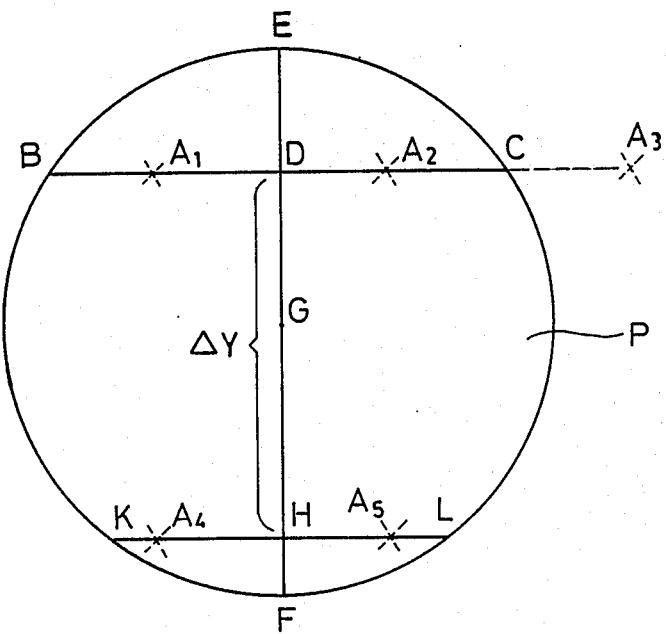
FIG. 3 illustrates the theory of calculating the approximate center of a figure in a large area being photographed according to the present invention.

2, FIG. 3 illustrates the separated figure P ($A_1$ being a dark point) being located at grid point $A_1$. The scanning will be made from the mid-point D on a horizontal line BC including point $A_1$ within the separated figure P downwards at a distance $\Delta Y$ to point H. If the point H is within the scope of the separated figure P, a horizontal line KL including point H is drawn within the separated figure P, and the grid points $A_4$ and $A_5$ on the line KL are converted into bright points (denoting a non-separated figure) so as not to be processed again during the later inspection. After inspecting the point $A_1$, the next point to be inspected is the grid point $A_3$ following the point C; the grid point $A_2$ between point $A_1$ and point c will not be inspected.

3, FIG. 3 also illustrates the method of locating the center of a separated figure based on grid point $A_1$, in which the mid-point D of line BC serves as a base point to draw an upward line to meet point E on the upper edge of the separated figure, and to then draw a downward line to meet point F on the lower edge of the separated figure; then, find a mid-point G on line EF as the center of the separated figure.

2. Conversion of the image coordinates of the center of the separated figure into the X-Y table (diagram) coordinates:

After the image coordinates of the center of the diagram are converted into the X-Y table coordinates, the geometrical deformation of the image is corrected by means of a mathematical method so as to minimize the conversion error of coordinates. The image deformation is usually caused by the lens aberration of the camera and electrical errors in the device; these errors affect the linear relation between a length in the image and the corresponding length of the real diagram. In order to precisely and quickly convert the coordinates of separate figure centers of the image into the coordinates on the X-Y table, a matrix conversion method or a specific gravity differential method according to the present invention is used, and they are described respectively as follows:

(1) The matrix conversion method:

The image coordinates of the aforesaid reference points on the image are determined by means of the several reference points of the known coordinates on the X-Y table, and a matrix T is derived from the aforesaid two sets of coordinates (the X-Y table coordinates and the image coordinates), so as to convert the coordinates between the image and the X-Y table; the matrix T is shown as follows:

$$[T] = \begin{pmatrix} T_{11} & T_{12} & T_{13} \\ T_{21} & T_{22} & T_{23} \\ T_{31} & T_{32} & 1 \end{pmatrix}$$

Once the coordinates (x, y) of any point in the image have been known, the corresponding coordinates (X, Y) on the X-Y table can be found with the following equation:

$$[T] = \begin{pmatrix} x \\ y \\ 1 \end{pmatrix} = \begin{pmatrix} A \\ B \\ t \end{pmatrix} \quad (1)$$

$$X = A/t, \; Y = B/t \quad (2)$$

The matrix T can be found by using the coordinates of the four reference points, i.e., the image coordinates $(u_j, v_j)$, j=1,2,3,4 and the cooresponding X-Y table coordinates $(U_j, V_j)$, j=1,2,3,4 as an example, which is described as follows:

$$[T] = \begin{pmatrix} T_{11} & T_{12} & T_{13} \\ T_{21} & T_{22} & T_{23} \\ T_{31} & T_{32} & 1 \end{pmatrix} \quad (3)$$

$$[T] = \begin{pmatrix} u_j \\ v_j \\ 1 \end{pmatrix} = \begin{pmatrix} a_j \\ b_j \\ t_j \end{pmatrix} \quad (4)$$

$$U_j = a_j/t_j, \; V_j = b_j/t_j \quad (5)$$

After being simplified:

$$T_{11}*u_j + T_{12}*v_j + T_{13} - U_j*T_{31}*u_j - U_j*T_{32}*v_j = U_j \quad (6)$$

$$T_{21}*u_j + T_{22}*v_j + T_{23} - V_j*T_{31}*u_j - V_j*T_{32}*v_j = V_j \quad (7)$$

The matrix T can be solved by means of the following matrix equation:

$$\begin{pmatrix} u_1 & v_1 & 1 & 0 & 0 & 0 & -U_1*u_1 & -U_1*v_1 \\ 0 & 0 & 0 & u_1 & v_1 & 1 & -V_1*u_1 & -V_1*u_1 \\ u_2 & v_2 & 1 & 0 & 0 & 0 & -U_2*u_2 & -U_2*v_2 \\ 0 & 0 & 0 & u_2 & v_2 & 1 & -V_2*u_2 & -V_2*v_2 \\ u_3 & v_3 & 1 & 0 & 0 & 0 & -U_3*u_3 & -U_3*v_3 \\ 0 & 0 & 0 & u_3 & v_3 & 1 & -V_3*u_3 & -V_3*v_3 \\ u_4 & v_4 & 1 & 0 & 0 & 0 & -U_4*u_4 & -U_4*v_4 \\ 0 & 0 & 0 & u_4 & v_4 & 1 & -V_4*u_4 & -V_4*v_4 \end{pmatrix} \begin{pmatrix} T_{11} \\ T_{12} \\ T_{13} \\ T_{21} \\ T_{22} \\ T_{23} \\ T_{31} \\ T_{32} \end{pmatrix} = \begin{pmatrix} U_1 \\ V_1 \\ U_2 \\ V_2 \\ U_3 \\ V_3 \\ U_4 \\ V_4 \end{pmatrix} \quad (8)$$

In real operation, an image can be divided into a plurality of rectangular districts in accordance with the precision; the four top points of each rectangular district are calculated too obtain a matrix [T] as to convert the coordinates.

(2) The specific gravity differential method:

1, A a given number of reference points $(u_i, v_i)$ in are set the image, i=1,2,3, . . . n, n being an interger such as and the corresponding coordinates on the X-Y table are defined $(U_i, V_i)$, i=1,2, . . . n.

2, To calculate $K_i$, $M_i$:

$$K_i = U_i/u_i, \; i=1 \text{ to } n;$$

$$M_i = V_i/v_i, \; i=1 \text{ to } n;$$

3, The coordinates of a given point in the image are defined as (x, y), and the distance d between the coordinates and the various reference points $(u_i, v_i)$ is then calculated:

$$d_i = \sqrt{(x - u_i)^2 + (y - v_i)^2}, \; i = 1 \text{ to } n.$$

4, To calculate the values of K, M:

$$K = \sum_{i=1}^{n} \frac{K_i}{d_i} \Big/ \sum_{i=1}^{n} \frac{1}{d_i};$$

$$M = \sum_{i=1}^{n} \frac{M_i}{d_i} \Big/ \sum_{i=1}^{n} \frac{1}{d_i};$$

5, The corresponding coordinates (X, Y), on the X-Y table with respect to the image coordinate (x, y are determined):

$$X = K*Y$$

$$Y = M*Y$$

3. Arrangement of the whole separated figures are arranged in a suitable sequence so as to obtain an effective path to photograph every details of the diagram:

The whole separated figures are arranged in sequence so as to facilitate photographing each of the separated figures. The ideal permutation principle is to set a separated figure being the nearest one to the first separated figure as the second separated figure, and to set a separated figure being most adjacent to the second separated figure as the third separated figure, and so on; however, in case of a diagram having a considerable number of separate figures, the aforesaid ideal permutation principle would require large calculation time, which would affect the operation speed.

In the present invention, a "district-dividing and direction-alternating permutation method" is developed, described as follows in the following two steps:

(1) District-dividing:

In order to improve the operation efficiency, the present invention has been so designed that the time for the X-Y table 1 to move from one separated figure to the next separated figure would not be longer than the time for the image processing unit 6 to calculate precisely the data of a separated figure. Since the moving speed of the X-Y table 1 is limited, a whole diagram 20 should be divided into a number of districts before the permutation sequence is performed. The principle of dividing a diagram into many districts is that the time for the X-Y table moving between two farthest separated figures in a district should be less than or equal to the time for the image processing unit 6 to calculate precisely the data of a separated figure; in that case, the calculation operation of the image processing unit 6 would not be interrupted upon each of the separated figures being photographed in detail.

Figure 4:
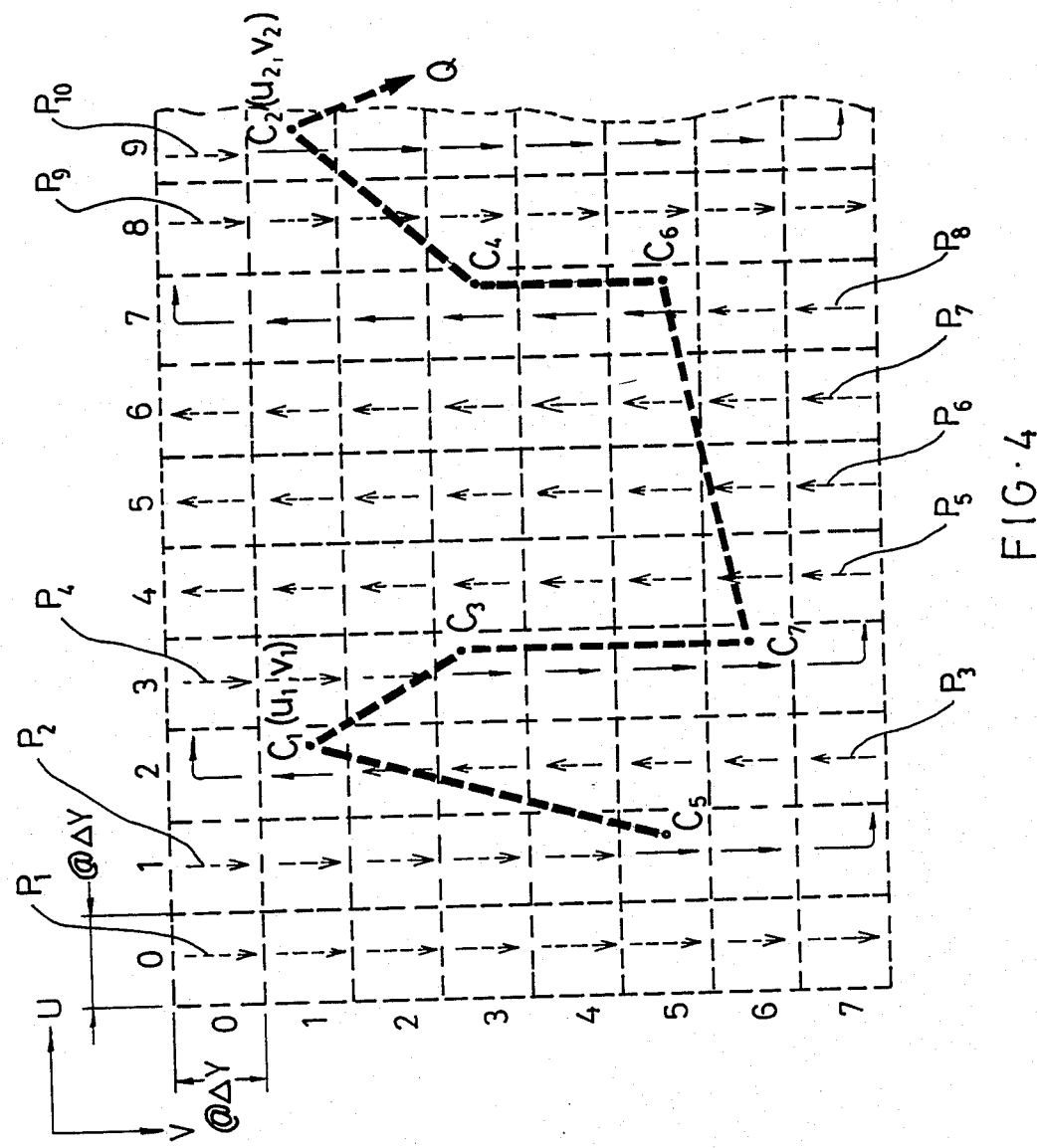
FIG. 4 illustrates an example of the sorting rule of the figures according to the present invention.

(2) Permutation sequence:

As shown in FIG. 4, the image is divided into $\Delta y * \Delta y$ square lattices in accordance with the value of $\Delta y = D_s - C$ as mentioned above in the grid-point skipping inspection method: each square lattice corresponds to the center of a separated figure only, i.e, n separated figure center coordinates $C_i (u_i, v_i)$, $i = 1, 2 \ldots n$, are formed into n sets of numeral rows $(a_i, b_i, i)$ so as to be used for making permutation sequence, where i denotes the series number of the separated figures, being integers from 1 to n; a is the rounded integer of $(u_i/\Delta y)$ which denotes the U-axial position of a separated figure $C$; and is the rounded integer of $(v_i/\Delta y)$ which denotes the V-axial position of the separated figure $C_i$ and i denotes the series number of a separated figure. As an example, the corresponding numeral row of the separated figure $C_1$ in FIG. 4 is (2, 1, 1); the corresponding numeral row of the separated figure $C_2$ is (9, 1, 2), and so on. In the aforesaid numeral row, the first value $a_i$ of the various numeral rows is arranged in a sequence from small to a large value. In the case where the first value $a_i$ of two or more than two numeral rows is the same, the sequence of the numeral rows will be determined by the quantity of the second value $b_i$ thereof; further, the permutation sequence of the $b_i$ value is also determined in accordance with whether the preceding $a_i$ numeral row exists or not. FIG. 4 describes the permutation sequence, in which the series of arrows $P_1, P_2 \ldots P_9$ denote the execution sequence to inspect whether a separated figure exists in each of the square lattices or not; for instance, in column $P_1$ as shown by the arrow, there is no separated figure existing, and therefore the same inspection direction as that of column P is continued in column $P_2$. Upon the separated figure $C_5$ being detected in column $P_2$, the series number "5" is recorded as the first separated figure in the permutation. In column $P_3$, since the numeral row $a_2$ is not empty, the inspection direction is reversed, and the separated figure $C_1$ is detected. In column $P_4$, the inspection direction is reversed to detect the separated figures $C_3$ and $C_7$, and so on; in other words, the various separated figures can be permuted into a series of Q photographing path, i.e., $C_5, C_1, C_3, C_7, C_6, C_4$ and $C_2$. The aforesaid direction-changing permutation method can quickly obtain in effect the best (the shortest) path of permutation in comparison with the ordinal number permutation sequence, i.e., $C_1, C_2, C_3, \ldots C_7$ so as to reduce the moving distance of the X-Y table and time, and to increase the operation efficiency.

4. Performing a precise photographing process for each separated figure:

By using camera 5 for a small area, the separated figures respectively on diagram 20 are photographed in accordance with the sequence determined in step 3 above; the photographing is made after the X-Y table (diagram 20) has moved to a given position. To confirm that the X-Y table has reached a given position, any conventional method may be used to whether the X-Y table or the driving device thereof has moved to the proper position. After one photograph is done, X-Y table 1 will be moved to the next position. the image processing unit 6 processes the image photographed simultaneously. The image is first processed with the auto-binary-thresholding processing step described above; since an image is photographed by aiming at the approximate center of a separated figure as obtained from step 1, the image center must be within the separated figure so that the edge points of the separated figure can be found in accordance with the center of the image, i.e., starting from the image center outwardly to find the contour of the figure. The precise center coordinate of a separated figure can be determined by averaging the coordinates of all the edge points. The shape and size of the separated figure can also be derived from its contour information.

5. Conversion of the precise image coordinates of the center of separated figures into the coordinates of the X-Y table, i.e., the coordinates of a diagram: the conversion method and steps are the same as those mentioned in 2 above.

6. Classifying and arranging the separated figures in a suitable sequence in accordance with the size and shape data obtained by means of the steps described in step 4 above: the method of permutation sequence is the same as the steps mentioned in step 3 above so as to provide the processing device with the necessary control data. The aforesaid control data can directly transmitted to the processing device, or indirectly transmitted to the processing device via a tape puncher by means of a conventional technique.

Therefore, according to the present invention two cameras are used for photographing a large area of a diagram and a single separated figure at a time upon the X-Y table being moved; the movement of the X-Y table and the image processing operation are made simultaneously; the image is processed through a auto-binary-thresholding processing technique so as to facilitate the image processing unit to analyze and to calculate the center position, the size and the shape of the various separated figures. The center positions are then converted into the corresponding coordinates of the X-Y table by means of the geometrical deformation-revising and coordinate conversion method; moreover, the aforesaid processing steps also include the district-dividing method to a diagram and the direction-changing permutation method for the separated figures so as to have the diagram reading operation done at a high speed and a high precision criteria. The aforesaid method and device according to the present invention are deemed valuable in the industrial field.

We claim:

1. A method for identifying and locating separated figures on a plane diagram which is to be operated upon, comprising the steps of:
   photographing a large area of said plane diagram;
   identifying with respect to a first coordinate system coordinates of the approximate center of each separated figure located within said large area;
   determining a precision photographing path from one such figure to another on the basis of said coordinates of each separated figure;
   photographing a small area of said plane diagram along said precision photographing path;
   identifying with respect to said first coordinate system second coordinates of the precise center, size and shape of each separated figure within said small area;
   classifying and arranging each separated figure in a second sequence on the basis of each corresponding size and shape of each separated figure; and
   providing said second sequence as operation data for operation upon said plane diagram.

2. A method as recited in claim 1, wherein:
   said step identifying said approximate center comprises the steps of:
      determining said approximate center of each separated figure located within said large area, and
      converting said approximate center of each separated figure to said coordinates with respect to said first coordinate system, said first coordinate system being defined with respect to said plane diagram; and
   said step identifying said precise center comprises the steps of:
      determining said precise center, size and shape of each separated figure within said small area, and
      converting said precise center of said separated to said second coordinates with respect to said first coordinate system.

3. A method as recited in claim 2, wherein said approximate center determining step includes the steps of:
   determining a binary threshold on the basis of a multilevel gray scale of an image of said large area, said binary threshold distinguishing said separated figures from a background of said plane diagram;
   inspecting a plurality of grid points on said large area image in a regular sequence to determine the presence of a separated figure; and
   scanning a plurality of grid points within said separated figure, said grid points being defined as bright points to prevent further inspection, said bright points indicating a nonseparated figure.

4. A method as recited in claim 3, wherein said precision photographing path determining step comprises the steps of:
   dividing said plane diagram into a plurality of corresponding rows and columns to form districts, wherein at least two separate figures within a district are scanned within a predetermined time;
   assigning a corresponding row, column and series value to each of said separated figures, said corresponding row and column values being assigned on the basis of a location of each of said separated figures within said districts; and
   defining a direction-alternating permutation sequence, said sequence-defining step comprising the steps of:
      first arranging said separated figures with respect to increasing column values,
      assigning a first inspection direction within said first column, wherein said series values of said separated figures located within said first column are respectively arranged with respect to increase row values;
      analyzing a next column,
      second arranging said separated figures in another inspection direction if a separated figure is present within said column being analyzed, said second arranging step alternating between said first inspection direction and a second inspection direction, said second inspection direction respectively arranging said series values of said separated figures within said column being analyzed with respect to decreasing row values, and
      repeating said previous two steps until all of said columns are analyzed.

5. A method as recited in claim 4, wherein said predetermined time is less than a time period necessary for precise calculation of a general separated figure.

6. A method as recited in claim 3, wherein said step converting said precise center to said second corresponding coordinate is equivalent to said step converting said approximate center to said coordinate with respect to said plane diagram.

7. A method as recited in claim 3, wherein said step classifying and arranging each separated figure in a second sequence is equivalent to said step determining said precision photographing path.

8. An apparatus for recognizing a plurality of separated figures on a plane diagram comprising:
   an X-Y table for supporting said plane diagram, said X-Y table being capable of moving said plane diagram along a first and second axis;
   photographic means, disposed above said plane diagram, for taking a first and second image of said plane diagram;
   means for determining an approximate center of each separated figure located within said first image;
   path determining means for determining a precision photographing path in response to the locations of each of said separated figures within said first image, said precision photographing path providing a sequence of each of said separated figures, said photographic means taking said second image as said X-Y table moves said plane diagram in response to said precision photographing path;
   means for determining a corresponding size, shape and precise center of each separated figure in said second image;
   processing means for arranging said separated figures in a second sequence on the basis of said corresponding size, shape and location of said precise center of each separated figure in said second image; and
   output means for providing said second sequence to an external device.

9. An apparatus as recited in claim 8, wherein said photographic means comprises a first camera for taking said first image, and a second camera for taking said second image.

10. An apparatus as recited in claim 8, wherein said means for determining an approximate center converts said approximate center of each separated figure to a coordinate with respect to said plane diagram.

* * * * *